(12) United States Patent
Lee et al.

(10) Patent No.: US 11,929,498 B2
(45) Date of Patent: Mar. 12, 2024

(54) SILICON-CARBON COMPLEX AND LITHIUM SECONDARY BATTERY COMPRISING THE SAME

(71) Applicant: LG CHEM, LTD., Seoul (KR)

(72) Inventors: Su Min Lee, Daejeon (KR); Eun Kyung Kim, Daejeon (KR); Yong Ju Lee, Daejeon (KR); Rae Hwan Jo, Daejeon (KR); Dong Hyuk Kim, Daejeon (KR); Se Mi Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 641 days.

(21) Appl. No.: 16/756,305

(22) PCT Filed: Oct. 26, 2018

(86) PCT No.: PCT/KR2018/012858
§ 371 (c)(1),
(2) Date: Apr. 15, 2020

(87) PCT Pub. No.: WO2019/083332
PCT Pub. Date: May 2, 2019

(65) Prior Publication Data
US 2020/0243853 A1 Jul. 30, 2020

(30) Foreign Application Priority Data

Oct. 27, 2017 (KR) .................. 10-2017-0140767

(51) Int. Cl.
*H01M 4/38* (2006.01)
*H01M 4/02* (2006.01)
(Continued)

(52) U.S. Cl.
CPC .......... *H01M 4/386* (2013.01); *H01M 4/134* (2013.01); *H01M 4/366* (2013.01); *H01M 4/663* (2013.01);
(Continued)

(58) Field of Classification Search
CPC ...... H01M 4/134; H01M 4/386; H01M 4/663; H01M 10/0525; H01M 2004/021; H01M 2004/027
See application file for complete search history.

(56) References Cited

U.S. PATENT DOCUMENTS 6,300,013 B1   10/2001   Yamada et al.
2006/0040182 A1   2/2006   Kawakami et al.
(Continued)

FOREIGN PATENT DOCUMENTS

CN   1717822 A   1/2006
CN   1765024 A   4/2006
(Continued)

OTHER PUBLICATIONS

Machine translation of WO 2018097213 A1 (Year: 2018).*
(Continued)

*Primary Examiner* — Jonathan G Leong
*Assistant Examiner* — Katharine A Caughron
(74) *Attorney, Agent, or Firm* — Birch, Stewart, Kolasch & Birch, LLP

(57) ABSTRACT

A silicon-carbon complex comprising carbon-based particles and silicon-based particles, wherein the silicon-based particles are dispersed and positioned on surfaces of the carbon-based particles, the carbon-based particles have a specific surface area of 0.4 $m^2/g$ to 1.5 $m^2/g$, and the silicon-based particles are doped with one or more elements selected from the group consisting of Mg, Li, Ca, and Al,
(Continued)

and a negative electrode active material for lithium secondary battery comprising the same.

12 Claims, 1 Drawing Sheet

(51) Int. Cl.
*H01M 4/134* (2010.01)
*H01M 4/36* (2006.01)
*H01M 4/66* (2006.01)
*H01M 10/0525* (2010.01)

(52) U.S. Cl.
CPC .. *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2007/0224508 A1 | 9/2007 | Aramata et al. | |
| 2007/0224509 A1 | 9/2007 | Aramata et al. | |
| 2010/0136432 A1 | 6/2010 | Kim | |
| 2014/0050979 A1 | 2/2014 | Woo et al. | |
| 2014/0137222 A1 | 5/2014 | Nguyen et al. | |
| 2014/0317727 A1 | 10/2014 | Nguyen et al. | |
| 2015/0194698 A1 | 7/2015 | Youm | |
| 2015/0295233 A1 | 10/2015 | Mutoh et al. | |
| 2015/0325847 A1 | 11/2015 | Kang | |
| 2016/0190552 A1 | 6/2016 | Murata et al. | |
| 2017/0133671 A1 | 5/2017 | Choi et al. | |
| 2018/0069235 A1 * | 3/2018 | Lee | H01M 4/386 |
| 2018/0151873 A1 | 5/2018 | Matsuno et al. | |
| 2018/0219225 A1 | 8/2018 | Choi et al. | |

FOREIGN PATENT DOCUMENTS

| | | | | |
|---|---|---|---|---|
| CN | 103190018 A | | 7/2013 | |
| CN | 103477477 A | | 12/2013 | |
| CN | 104377351 A | | 2/2015 | |
| CN | 104779397 A | | 7/2015 | |
| CN | 105453314 A | | 3/2016 | |
| CN | 105938906 A | * | 9/2016 | ........ H01M 10/0525 |
| CN | 106654194 A | | 5/2017 | |
| JP | 2000-357515 A | | 12/2000 | |
| JP | 2005-108774 A | | 4/2005 | |
| JP | 2005108774 A | * | 4/2005 | ........ H01M 10/0525 |
| JP | 2007-294423 A | | 11/2007 | |
| JP | 2008-186732 A | | 8/2008 | |
| JP | 2012-124116 A | | 6/2012 | |
| JP | 2016-178008 A | | 10/2016 | |
| KR | 2005004930 A | * | 1/2005 | ........ H01M 10/0525 |
| KR | 10-2005-0087148 A | | 8/2005 | |
| KR | 10-2007-0096932 A | | 10/2007 | |
| KR | 10-2007-0096933 A | | 10/2007 | |
| KR | 10-2010-0062083 A | | 6/2010 | |
| KR | 10-2013-0120707 A | | 11/2013 | |
| KR | 10-2014-0082036 A | | 7/2014 | |
| KR | 10-2014-0101640 A | | 8/2014 | |
| KR | 10-2015-0075208 A | | 7/2015 | |
| KR | 10-2015-0084795 A | | 7/2015 | |
| KR | 10-2015-0084894 A | | 7/2015 | |
| KR | 20150113771 A | * | 10/2015 | ............ H01M 4/366 |
| KR | 10-2016-0030278 A | | 3/2016 | |
| KR | 10-2016-0083718 A | | 7/2016 | |
| KR | 10-2017-0044605 A | | 4/2017 | |
| KR | 10-2017-0044606 A | | 4/2017 | |
| KR | 10-2017-0104235 A | | 9/2017 | |
| WO | WO 2015/059859 A1 | | 4/2015 | |
| WO | WO 2016/194288 A1 | | 12/2016 | |
| WO | WO-2018097213 A1 | * | 5/2018 | .......... H01M 10/052 |

OTHER PUBLICATIONS

Espacenet machine translation of KR20150113771A (Year: 2015).*
Extended European Search Report, dated Sep. 30, 2020, for European Application No. 18871357.2.
International Search Report (PCT/ISA/210) issued in PCT/KR2018/012858, dated Apr. 11, 2019.

* cited by examiner

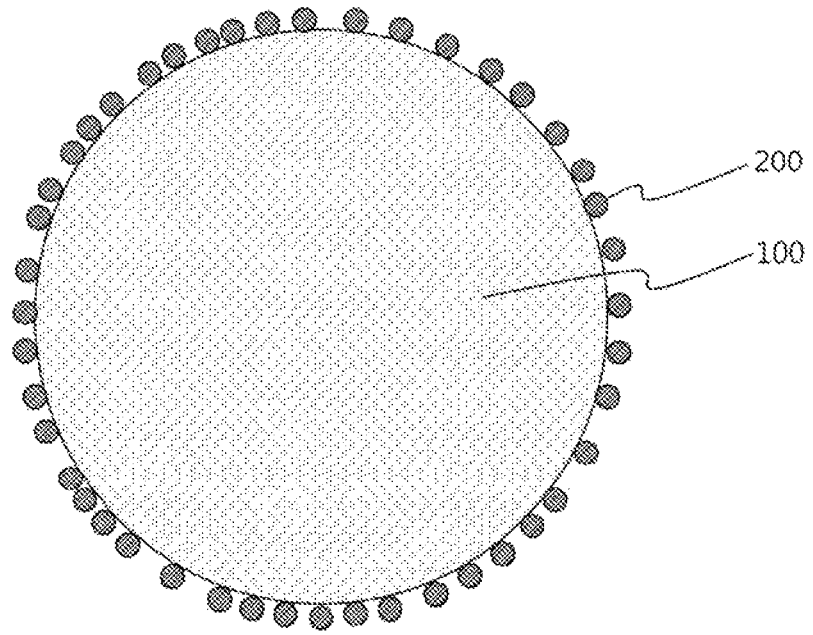

SILICON-CARBON COMPLEX AND LITHIUM SECONDARY BATTERY COMPRISING THE SAME

CROSS-REFERENCE TO RELATED APPLICATIONS

This application claims the benefit of Korean Patent Application No. 10-2017-0140767, filed on Oct. 27, 2017, in the Korean Intellectual Property Office, the disclosure of which is incorporated herein in its entirety by reference.

TECHNICAL FIELD

The present invention relates to a silicon-carbon complex and a lithium secondary battery comprising the same, and more specifically, to a silicon-carbon complex with improved initial efficiency, volume expansion and lifespan properties, and a lithium secondary battery comprising the same.

BACKGROUND ART

As technology development and demand for mobile devices have increased, the demand for secondary batteries as an energy source has been significantly increased. Among such secondary batteries, lithium secondary batteries having high energy density and operating potential, long cycle life, and low self-discharging rate have been commercialized and widely used.

Typically, a lithium metal has been used as a negative electrode of a secondary battery. However, since a risk of battery short circuit due to the formation of dendrite and battery explosion caused thereby became known, the lithium metal has been replaced by a carbon-based compound capable of intercalation and de-intercalation of reversible lithium ions while maintaining the structural and electrical properties thereof.

The carbon-based compound has a very low discharge potential of about −3V with respect to a standard hydrogen electrode potential, and exhibits excellent electrode cycle life properties due to highly reversible charge and discharge behavior caused by uniaxial orientation of a graphite plate layer. Also, when Li ions are charged, the electrode potential is 0V Li/Li$^+$, exhibiting a potential almost similar to that of a pure lithium metal, so that there is an advantage in that when an oxide-based positive electrode and a battery are formed, higher energy may be obtained.

Natural graphite which is typically used as a negative electrode has a large capacity per unit weight, but the degree of orientation is increased when an electrode is roll pressed, thereby deteriorating the input/output properties of lithium ions, so that there is a disadvantage in that rapid charging properties of a battery are deteriorated. In comparison, artificial graphite has a relatively low degree of orientation than natural graphite when an electrode is roll pressed, thereby having good input/output properties lithium ions, so that there are advantages in that rapid charging properties of a battery are improved and long lifespan properties due to low expansion are exhibited. Although there have been attempts to secure the long lifespan properties of a lithium secondary battery by applying artificial graphite having such advantages, artificial graphite has a disadvantage of having low adhesion force to a negative electrode current collector.

Meanwhile, since silicon (Si) has a high theoretical capacity (4,200 mAh/g) for a negative electrode active material, a variety of studies have been conducted to replace the carbon-based compound with the same.

However, in most silicon negative electrode materials, the volume of silicon is expanded up to 300% due to intercalation of lithium, thereby destroying a negative electrode, so that there is a disadvantage in that high cycle characteristics are not exhibited. In addition, in the case of silicon, the volume thereof is expanded due to the intercalation of lithium as a cycle continues, and fading mechanism such as pulverization, contact losses with conducting agents and a current collector, and the unstable formation of a solid-electrolyte-interphase (SEI) may be exhibited.

Accordingly, the development of a new technology capable of maximizing the advantages of overcoming the disadvantages caused by the use of conventional carbon-based compounds and silicon is required.

DISCLOSURE OF THE INVENTION

Technical Problem

An aspect of the present invention provides a silicon-carbon complex exhibiting excellent initial efficiency, volume expansion and lifespan properties when used as a negative electrode active material by having silicon-based particles doped with a metal element dispersed on surfaces of carbon-based particles.

Another aspect of the present invention provides a negative electrode slurry composition for a lithium secondary battery comprising the silicon-carbon complex and exhibiting excellent initial efficiency, volume expansion and lifespan properties.

Another aspect of the present invention provides a lithium secondary battery comprising the silicon-carbon complex.

Technical Solution

According to an aspect of the present invention, there is provided a silicon-carbon complex comprising carbon-based particles and silicon-based particles, wherein the silicon-based particles are dispersed and positioned on surfaces of the carbon-based particles, the carbon-based particles have a specific surface area of 0.4 m$^2$/g to 1.5 m$^2$/g, and the silicon-based particles are doped with one or more elements selected from the group consisting of Mg, Li, Ca, and Al.

According to another aspect of the present invention, there is provided a negative electrode slurry composition for a lithium secondary battery comprising the silicon-carbon complex.

According to yet another aspect of the present invention, there is provided a lithium secondary battery comprising the silicon-carbon complex.

Advantageous Effects

An aspect of the present invention provides a silicon-carbon complex exhibiting excellent initial efficiency, volume expansion and lifespan properties when used as a negative electrode active material by having silicon-based particles doped with a metal element dispersed on surfaces of carbon-based particles.

BRIEF DESCRIPTION OF THE DRAWINGS

The following drawings attached herein illustrate preferred embodiments of the present invention by example, and serve to enable technical concepts of the present invention to be further understood together with detailed description of the invention given below, and therefore the present invention should not be interpreted only with matters in such drawings.

The FIGURE is a cross-sectional view of a negative electrode active material for a lithium secondary battery according to an embodiment of the present invention.

BEST MODE FOR CARRYING OUT THE INVENTION

Hereinafter, the present invention will be described in more detail to facilitate understanding of the present invention.

It will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A silicon-carbon complex according to the present invention comprises carbon-based particles and silicon-based particles, wherein the silicon-based particles are dispersed and positioned on surfaces of the carbon-based particles, the carbon-based particles have a specific surface area of 0.4 m$^2$/g to 1.5 m$^2$/g, and the silicon-based particles are doped with one or more elements selected from the group consisting of Mg, Li, Ca, and Al.

The carbon-based particles have a specific surface area of 0.4 m$^2$/g to 1.5 m$^2$/g, specifically 0.4 m$^2$/g to less than 1.5 m$^2$/g, more specifically 0.9 m$^2$/g to 1.0 m$^2$/g. When the carbon-based particles have a specific surface area in the above range, an appropriate level of conductivity may be exhibited due to a specific surface area above a predetermined level, an initial irreversible capacity at the time of charge and discharge due to the specific surface area may be prevented from being increased, and a side reaction with an electrolyte occurs to an appropriate extent, so that a battery comprising the same may exhibit excellent lifespan properties.

Also, the carbon-based particles may have a tap density of 0.7 g/cc to 1.0 g/cc, specifically 0.75 g/cc to 0.95 g/cc, more specifically 0.8 g/cc to less than 0.9 g/cc. When the carbon-based particles have a tap density in the above range, a negative electrode active material may have excellent energy density, and when manufacturing an electrode comprising the same, excellent processibility may be exhibited.

Also, the carbon-based particles may have a c-axis direction crystal size of 60 nm to 90 nm, specifically 65 nm to 85 nm, more specifically 70 nm to 80 nm. When the crystal size of the carbon-based particles are small, the capacity of an active material is reduced due to low crystallinity, and the hardness of the particles is increased, so that it may be difficult to form a complex with the silicon-based particles. Also, when the crystal size of the carbon-based particles is large, the length of lithium ions to be diffused after being intercalated between graphite layers of the carbon-based particles is long, so that the intercalation and de-intercalation of lithium ions may not be easily achieved. Thus, diffusion resistance increases and lithium precipitation occurs during high-rate charge and discharge, so that lifespan properties are deteriorated. By having a crystal size in the above range, the carbon-based particles may exhibit appropriate capacity and excellent output properties and life properties.

In one example of the present invention, the carbon-based particles may be spherical artificial graphite secondary particles in which carbon-based primary particles are assembled.

The carbon-based primary particles may have an average particle diameter ($D_{50}$) of 1 μm to 10 μm, specifically 2 μm to 9 μm, more specifically 3 μm to 8 μm. In the case in which the average particle diameter ($D_{50}$) of the carbon-based primary particles satisfy the above range, when the carbon-based primary particles are gathered to form secondary particles, the contact between the primary particles are uniform, so that the strength of the secondary particles may be increased and the secondary particles may appropriately exhibit a spherical particle shape.

The spherical artificial graphite secondary particles may have an average particle diameter ($D_{50}$) of 10 μm to 30 μm, specifically 15 μm to 25 μm, more specifically 17 μm to 22 μm. When the spherical artificial graphite secondary particles have an average particle diameter ($D_{50}$) in the above range, a more appropriate electrode density may be obtained, so that an electrode comprising the same may have an appropriate capacity per volume, and when forming the electrode, an electrode slurry may be appropriated coated with a uniform thickness.

The spherical artificial graphite secondary particles are not artificial graphite secondary particles in a linear shape, plate shape, flake shape or the like, and comprises artificial graphite secondary particles in a sphere shape, oval shape, block shape or the like.

Also, in another example of the present invention, the carbon-based particles may be flake-type artificial graphite particles in which plate-type carbon-based primary particles are assembled.

The plate-type carbon-based primary particles may have an average long axis length ($D_{50}$) of 1 μm to 20 μm, specifically 14 μm to 18 μm, more specifically 15 μm to 17 μm, and may have an aspect ratio of 0.01 to 0.5, specifically 0.1 to 0.3, more specifically 0.15 to 0.25.

In the case in which the plate-type carbon-based primary particles satisfy the above average long axis length ($D_{50}$) range, when the carbon-based primary particles are gathered to form flake-type artificial graphite particles, the contact between the primary particles are uniform, so that the strength of secondary particles may be increased and the secondary particles may appropriately secure an air gap. Also, when the aspect ratio of particles satisfies the above range, the plate-type carbon-based primary particles may gather to appropriately form flake-type artificial graphite particles.

The flake-type artificial particles graphite may have an average long axis length ($D_{50}$) of 10 μm to 30 μm, specifically 15 μm to 25 μm, more specifically 17 μm to 22 μm, and may have an aspect ratio of 0.4 to 0.8, specifically 0.5 to 0.7, more specifically 0.55 to 0.65.

When the flake-type artificial graphite particles satisfies the above average long axis length ($D_{50}$), excellent output properties and life properties together with appropriate capacity properties may be exhibited.

When the average particle diameter ($D_{50}$) or the average long axis length ($D_{50}$) of the carbon-based particles is less than the above range, electrical conductivity may be lowered and lifespan properties may be deteriorated. When greater than the above range, the distance between at which lithium ions are intercalated and de-intercalated increases, and thus diffusion resistance increases and lithium precipitation occurs during high-rate charge and discharge, so that lifespan properties may be deteriorated.

In the silicon-carbon complex of the present invention, the silicon-based particles are dispersed and positioned on a surface of the carbon-based particles.

The silicon-based particles have a higher capacity than the artificial graphite particles, and thus may increase energy density.

Also, when the carbon-based particles are flake-type artificial graphite particles in which spherical artificial graphite secondary particles or plate-type carbon-based primary particles are assembled, the content of a functional group such as —OH present on the surface thereof is reduced during a firing process of a manufacturing process thereof, thereby deteriorating the coupling force to a negative binder, so that when a negative electrode current collector is coated by forming a negative electrode slurry, the adhesion force between the carbon-based particles and the negative electrode current collection and the adhesion force between the carbon-based particles are not sufficient. The silicon-based particles are positioned on the surface of the artificial graphite secondary particles to improve the coupling force of the carbon-based particles, so that the problem of low adhesion force may be overcome.

The silicon-based particles are dispersed and positioned on the surface of the carbon-based particles, and thus is not present only in some regions of the entire surface of the carbon-based particles, and may be evenly distributed without being aggregated with or coupled to each other.

The FIGURE is a cross-sectional view of a negative electrode active material for a lithium secondary battery according to an embodiment of the present invention. Referring to the FIGURE, in a negative electrode active material for a lithium secondary battery according to an embodiment of the present invention, silicon-based particles 200 may be dispersed and distributed on the surface of carbon-based particles 100.

The silicon-based particles may have an average particle diameter ($D_{50}$) of 10 nm to 3,000 nm, specifically 50 nm to 500 nm, more specifically 100 nm to 300 nm. When the average particle diameter ($D_{50}$) of the silicon-based particles are too small, a side reaction with an electrolyte occurs on a large scale, so that lifespan performance may be deteriorated. When the average particle diameter ($D_{50}$) is too large, volume expansion occurs on a large scale during charge and discharge causing a crack in the particles, so that the lifespan performance may be deteriorated. Accordingly, when the silicon-based particles satisfy the above range, the side reaction with the electrolyte and the volume expansion of the silicone-based particles may be maintained to an appropriate degree, so that a battery comprising the same may exhibit excellent lifespan properties.

The silicon-based particles may be Si particles, silicon oxide particles ($SiO_x$, $0<x\leq2$), or a mixture thereof, and may be specifically Si particles.

The silicon-based particles may be doped with one or more elements selected from the group consisting of Mg, Li, Ca, and Al in an amount of 0.5 wt % to 30 wt % based upon a total weight of the silicon based particles, specifically 5 wt % to 21 wt %, more specifically 6 wt % to 15 wt %. When the silicon-based particles contain the doping element in the above range, initial efficiency may be increased and excellent lifespan properties and swelling properties may be exhibited.

In one example of the present invention, the silicon-based particles may be doped with either Mg or Li, or both. In this case, the silicon-based particles may comprise the Mg in an amount of 0.5 wt % to 20 wt % based upon a total weight of the silicon-based particles, and the Li in an amount of 0.1 wt % to 10 wt % based upon a total weight of the silicon-based particles, specifically, the Mg in an amount of 4 wt % to 15 wt %, and the Li in an amount of 2 wt % to 6 wt %, more specifically the Mg in an amount of 4.5 wt % to 10 wt % and the Li in an amount of 2.5 wt % to 5 wt %. When the silicon-based particles contain the Mg and the Li as doping elements in the above range, further excellent initial efficiency, lifespan properties, and swelling properties may be exhibited.

The silicon-carbon complex may comprise the silicon-based particles in an amount of 1 wt % to 5 wt % based upon a total weight of the silicon-carbon complex, specifically 1 wt % to 4 wt %, more specifically 1 wt % to 2 wt %. When the silicon-based particles are included in the above range, the swelling properties of a negative electrode may be appropriately maintains, and excellent adhesion force and initial efficiency may be exhibited.

In the present invention, the specific surface area of carbon-based particles may be measured by the Brunauer-Emmett-Teller (BET) method. For example, using a porosimetry analyzer (Bell Japan Inc, Belsorp-II mini), the specific surface area may be measured by the BET 6-point method by the nitrogen gas adsorption/distribution method.

Also, the tap density may be obtained by filling the carbon-based particles in a container and measuring the apparent density of the particles obtained by vibrating the particles under predetermined conditions.

Also, the c-axis direction crystal size represents Lc (002), which is the size of a crystallite in the c-axis direction when measured by x-ray powder diffraction (XRD), and may be calculated by the Scherrer equation of Equation 1.

$$Lc = \frac{K\lambda}{\beta_{(2\theta)}\cos\beta}$$ [Equation 1]

K=Scherrer constant (K=0.9)
β=Half width
λ=Wavelength (0.154056 nm)
θ=Angle at maximum peak Also, the average long axis length ($D_{50}$) of the carbon-based particles may be defined as a long axis length at 50% of a particle diameter distribution, and the average particle diameter ($D_{50}$) of the carbon-based particles and the silicon-based particles may be defined as a particle diameter at 50% of the particle diameter distribution. The average long axis length ($D_{50}$) and the average particle diameter ($D_{50}$) of the carbon-based particles are not particularly limited, but may be measured by a laser diffraction method or by using a SEM photograph. When using the laser diffraction method, it is possible to measure a particle diameter of from a submicron region to several millimeters, and thus it is possible to obtain results with high reproducibility and high degradability.

In the specification of the present invention, the term "primary particle" represents an original particle when a different kind of particle is formed from a certain particle, and a plurality of primary particles may be gathered, coupled, or assembled to form secondary particles.

In the specification of the present invention, the term "secondary particle" represents a large particle which is physically distinguishable and formed by gathering, coupling and assembling an individual primary particle.

In the specification of the present invention, the term "assembling" of the primary particles refers to a process in which a plurality of primary particles are spontaneously or artificially aggregated or united to form an aggregate composed of primary particles, thereby forming secondary particles, and may be used in the same meaning as the term gathering or coupling.

The manufacturing of the silicon-carbon complex of the present invention may be performed by, for example, mixing the carbon-based particles and the silicon-based particles and mechanically milling the mixture, or by mixing the carbon-based particles and the silicon-based particles in a solvent and drying the mixture.

The mechanical milling may be performed by mechanically rubbing the artificial graphite secondary particles and the $SiO_2$ nano-particles using a roll-mill, a ball-mill, a high energy ball mill, a planetary mill, a stirred ball mill, a vibrating mill, or a jet-mill. For example, compressive stress may be mechanically applied by rotating with revolutions per minute of 100 rpm to 1,000 rpm. Through the mechanical milling, the $SiO_2$ nano-particles may be attached to the surface of the artificial graphite secondary particles.

The mixing in a solvent comprises a process of dispersing and mixing the carbon-based particles and the silicon-based particles in a solvent and then drying the mixture, and after the mixing in a solvent, the silicon-based particles may be attached to the surface of the carbon-based particles through the drying.

The solvent may be, for example, an alcohol such as methanol, ethanol, propanol, butanol, and heptanol, water, and a mixture thereof, and is not particularly limited as long as it does not affect the carbon-based particles and the silicon-based particles.

The one or more elements selected from the group consisting of Mg, Li, Ca, and Al to be doped on the silicon-based particles may be doped on the silicon-based particles by a method of mixing and firing a compound containing the silicon-based particles and the one or more elements selected from the group consisting of Mg, Li, Ca, and Al.

The firing may be performed at a temperature of 200° C. to 1,300° C., specifically 400° C. to 1,200° C., and may be performed for 1 to 20 hours, specifically 3 to 17 hours.

Such a silicon-carbon complex according to one example of the present invention may be usefully used as a negative electrode active material for a lithium secondary battery, and accordingly, the present invention provides a negative electrode active material composition for a lithium secondary battery containing the silicon-carbon complex and a lithium secondary battery containing the silicon-carbon complex.

The lithium secondary battery may comprise a positive electrode, a negative electrode, and a separator interposed between the positive electrode and the negative electrode.

The lithium secondary battery may comprise a positive electrode, a negative electrode for the lithium secondary battery, and a separator interposed between the positive electrode and the negative electrode.

The positive electrode may be manufactured by a typical method known in the art. For example, a positive electrode may be manufactured by mixing and stirring a positive electrode active material with a solvent, if necessary, a binder, a conductive agent, and a dispersant, to prepare a slurry, and applying (coating) the slurry on a current collector of a metal material followed by pressing and drying.

The current collector of a metal material is a metal having high conductivity, and is not particularly limited as long as it is a metal to which the slurry of the positive electrode active material can be easily bonded and which has high conductivity without causing a chemical change in the battery. For example, stainless steel, aluminum, nickel, titanium, fired carbon, or aluminum or stainless steel that is surface-treated with one of carbon, nickel, titanium, silver, and the like may be used. In addition, microscopic irregularities may be formed on the surface of the current collector to improve the adhesion force of the positive electrode active material. The current collector may be used in various shapes such as that of a film, a sheet, a foil, a net, a porous body, a foam body, a non-woven fabric body, and the like, and may have a thickness of 3 μm to 500 μm.

The positive electrode active material may be, for example, a layered compound such as a lithium cobalt oxide ($LiCoO_2$), a lithium nickel oxide ($LiNiO_2$) $Li[Ni_xCo_yMn_zMv]O_2$ (wherein M is any one or two or more elements selected from the group consisting of Al, Ga, and In; and $0.3 \leq x < 1.0$, $0 \leq y$, $z \leq 0.5$, $0 \leq v \leq 0.1$, $x+y+z+v=1$), and $Li(Li_aM_{b-a-b}M'_{b'})O_{2-c}A_c$ (wherein $0 \leq a \leq 0.2$, $0.6 \leq b \leq 1$, $0 \leq b' \leq 0.2$, $0 \leq c \leq 0.2$; M comprises one or more selected from the group consisting of Mn, Ni, Co, Fe, Cr, V, Cu, Zn, and Ti; M' is one or more selected from the group consisting of Al, Mg, and B, and A is one or more selected from the group consisting of P, F, S, and N) or a compound substituted with one or more transition metals; a lithium manganese oxide represented by Formula $Li_{1+y}Mn_{2-y}O_4$ (wherein y is 0 to 0.33), $LiMnO_3$, $LiMn_2O_3$, and $LiMnO_2$; a lithium copper oxide ($Li_2CuO_2$); a vanadium oxide such as $LiV_3O_8$, $LiFe_3O_4$, $V_2O_5$, and $Cu_2V_2O_7$; a Ni-site type lithium nickel oxide represented by Formula $LiNi_{1-y}M_yO_2$ (wherein M is any one of Co, Mn, Al, Cu, Fe, Mg, B, or Ga and y is 0.01 to 0.3); a lithium manganese complex oxide represented by Formula $LiMn_{2-y}M_yO_2$ (wherein M is any one of Co, Ni, Fe, Cr, Zn, or Ta, and y is 0.01 to 0.1) or Formula $Li_2Mn_3MO_8$ (wherein M is any one of Fe, Co, Ni, Cu, or Zn); $LiMn_2O_4$ in which a part of Li in the formula is substituted with an alkaline earth metal ion; a disulfide compound; $Fe_2(MoO_4)_3$, and the like, but is not limited thereto.

Examples of the solvent for forming the positive electrode may comprise organic solvents such as N-methyl pyrrolidone (NMP), dimethyl formamide (DMF), acetone, and dimethyl acetamide, or water, and these solvents may be used alone or in combination of two or more thereof. The amount of the solvent to be used is sufficient if the solvent may dissolve and disperse the positive electrode active material, the binder, and the conductive agent in consideration of an applying thickness of a slurry and preparing yield.

Examples of the binder may comprise a polyvinylidene fluoride-hexafluoropropylene copolymer (PVDF-co-HFP), polyvinylidenefluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, and poly acrylic acid, or a polymer having the hydrogen thereof substituted with Li, Na, or Ca, and the like, or various kinds of binder polymers such as various copolymers thereof.

The conductive material is not particularly limited as long as it has conductivity without causing a chemical change in the battery. For example, graphite such as natural graphite or artificial graphite; a carbon-based material such as carbon black, acetylene black, Ketjen black, channel black, furnace black, lamp black, and thermal black; conductive fiber such as carbon fiber and metal fiber; a conductive tube such as a carbon nanotube; metal powder such as fluorocarbon powder, aluminum powder, and nickel powder; a conductive whisker such as zinc oxide and potassium titanate; a conductive metal oxide such as titanium oxide; a conductive material such as a polyphenylene derivative, and the like may be used. The conductive material may be used in an amount of 1 wt % to 20 wt % based on the total weight of the positive electrode slurry.

The dispersant may be an aqueous dispersant or an organic dispersant agent such as N-methyl-2-pyrrolidone.

The negative electrode may be manufactured by a typical method known in the art. For example, the negative electrode may be manufactured by mixing and stirring the negative electrode active material with additives such as a binder and a conductive agent to prepare a negative electrode slurry, and applying (coating) the slurry on a negative electrode current collector followed by drying and pressing.

Examples of the solvent for forming the negative electrode may comprise organic solvents such as N-methyl pyrrolidone (NMP), dimethyl formamide (DMF), acetone, and dimethyl acetamide, or water, and these solvents may be used alone or in combination of two or more thereof. The amount of the solvent to be used is sufficient if the solvent may dissolve and disperse the negative electrode active material, the binder, and the conductive agent in consideration of an applying thickness of a slurry and preparing yield.

The binder may be used to bind negative electrode active material particles to hold a molded body, and is not particularly limited as long as it is a binder typically used in manufacturing a slurry for a negative electrode active material. For example, non-aqueous binders such as polyvinyl alcohol, carboxymethyl cellulose, hydroxypropyl cellulose, diacetyl cellulose, polyvinyl chloride, polyvinylpyrrolidone, polytetrafluoroethylene (PTFE), polyvinylidene fluoride (PVdF), polyethylene or polypropylene may be used. Also, any one selected from the group consisting of acrylonitrile-butadiene rubber, styrene-butadiene rubber, and acrylic rubber, which are aqueous binders, or a mixture of two or more thereof may be used. An aqueous binder is economical and eco-friendly when compared with a non-aqueous binder, and also harmless to the health of an operator. Since an aqueous binder has excellent binding effect when compared with a non-aqueous binder, the ratio of the active material per unit volume may be increased, thereby enabling high capacity. Preferably, styrene-butadiene rubber may be used as an aqueous binder.

The binder may be included in an amount of 10 wt % or less based on the total weight of the slurry for a negative electrode active material, specifically in an amount of 0.1 wt % to 10 wt %. If the content of the binder is less than 0.1 wt %, the effect of using the binder is insignificant, and if greater than 10 wt %, it is not preferable since there is a concern that the capacity per volume may be deteriorated due to a relative decreased in the content of the active material with an increase in the content of the binder.

The conductive agent is not particularly limited as long as it has conductivity without causing a chemical change in the battery. Examples of the conductive agent may comprise graphite such as natural graphite or artificial graphite; a carbon-based material such as carbon black, acetylene black, Ketjen black, channel black, furnace black, lamp black, and thermal black; conductive fiber such as carbon fiber and metal fiber; a conductive tube such as a carbon nanotube; metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like may be used. The conductive agent may be used in an amount of 1 wt % to 9 wt % based on the total weight of the slurry for a negative electrode active material.

A negative electrode current collector used in the negative electrode according to an embodiment of the present invention may have a thickness of 3 μm to 500 μm. The negative electrode current collector is not particularly limited as long as it has conductivity without causing a chemical change in the battery. For example, copper, gold, stainless steel, aluminum, nickel, titanium, fired carbon, copper or stainless steel that is surface-treated with one of carbon, nickel, titanium, silver, and the like, and an aluminum-cadmium alloy may be used. Also, microscopic irregularities may be formed on the surface of the negative electrode current collector to improve the adhesion of a negative electrode active material, and the negative electrode current collector may be used in various forms of such as a film, a sheet, a foil, a net, a porous body, a foam body, and a non-woven fabric body.

Also, as a separator, a typical porous polymer film used as a separator, for example, a porous polymer film prepared with a polyolefin-based polymer, such as an ethylene homopolymer, a propylene homopolymer, an ethylene/butene copolymer, an ethylene/hexene copolymer, and an ethylene/methacrylate copolymer may be used alone, or a laminated structure thereof may be used. Alternatively, a typical porous non-woven fabric, for example, a non-woven fabric formed of high melting point glass fibers or polyethylene terephthalate fibers may be used, but the embodiment of the present invention is not limited thereto.

A lithium salt which may be included as an electrolyte used in the present invention may be used without limitation as long as it is typically used as an electrolyte for a lithium secondary battery. For example, as an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

An organic solvent included in the electrolyte used in the present invention may be used without limitation as long as it is typically used in an electrolyte for a secondary battery. Representative examples thereof may be any one selected from the group consisting of propylene carbonate (PC), ethylene carbonate (EC), diethyl carbonate (DEC), dimethyl carbonate (DMC), ethyl methyl carbonate (EMC), methyl propyl carbonate, dipropyl carbonate, dimethyl sulfoxide, acetonitrile, dimethoxyethane, diethoxyethane vinylene carbonate, sulfolane, gamma-butyrolactone, propylene sulfite, and tetrahydrofuran, or a mixture of two or more thereof. Specifically, among the carbonate-based organic solvents, ethylene carbonate and propylene carbonate, which are cyclic carbonates, are organic solvents of high viscosity and have high dielectric constant so as to dissociate a lithium salt in an electrolyte well, and thus may be preferably used. When such a cyclic carbonate is mixed with a low viscosity, low dielectric constant linear carbonate such as dimethyl carbonate and diethyl carbonate in an appropriate ratio, an electrolyte having a high electrical conductivity may be prepared, and thus may be more preferably used. Specifically, a lithium secondary battery containing the negative electrode active material for a lithium secondary battery of the present invention contains graphite having a layer of alkali carbonate formed on the surface thereof, thereby having excellent propylene carbonate properties, and thus may preferably contain the propylene carbonate such that the lithium secondary battery may exhibit excellent low-temperature performance.

Optionally, the electrolyte stored in accordance with the present invention may further comprise an additive such as overcharge protection agent contained in a typical electrolyte.

The external shape of the lithium secondary battery of the present invention is not particularly limited, but may be a cylindrical shape using a can, a square shape, a pouch shape, a coin shape, or the like.

The lithium secondary battery according to the present invention may be used in a battery cell used as a power source of a small-sized device, and may be preferably used as a unit cell in a medium- and large-sized battery module comprising a plurality of battery cells, as well.

Preferable examples of the above medium- and large-sized devices comprise electric vehicles, hybrid electric vehicles, plug-in hybrid electric vehicles, and electric power storage systems, but are not limited thereto.

MODE FOR CARRYING OUT THE INVENTION

EXAMPLES

Hereinafter, the present invention will be described in more detail with reference to Examples and Experimental Examples. However, the present invention is not limited by these Examples and Experimental Examples. The embodiments according to the present invention can be modified into various different forms, and the scope of the present invention should not be construed as being limited to the embodiments described below. The embodiments of the present invention are provided to more fully describe the present invention to those skilled in the art.

Example 1

90 parts by weight of Si particles having an average particle diameter ($D_{50}$) of 300 nm, 10 parts by weight of $Mg(OH)_2$, and 10 parts by weight of LiOH were mixed, and then fired in a high-temperature firing furnace, the temperature of which may be controlled, at a temperature of 800° C. for 12 hours to prepare Si particles doped with Mg and Li in an amount of 6 wt % and 4 wt %, respectively.

98 parts by weight of artificial graphite particles having a specific surface area of 0.9 m$^2$/g, a tap density of 1.0 g/cc, a c-axis direction crystal size of 80 nm, an average particle diameter ($D_{50}$) of 22 μm and 2 parts by weight of Si particles having an average particle diameter ($D_{50}$) of 300 nm and doped with Mg and Li in an amount of 6 wt % and 4 wt %, respectively were subjected to mechanical milling to prepare a negative electrode active material having the Si particles attached to the surfaces of an artificial graphite secondary particles.

The negative electrode active material, super c65 (manufacturer) as a conductive agent, and polyvinylidene fluoride (PVdF) as a binder were mixed in N-methyl pyrrolidone (NMP) as a solvent in a weight ratio of 94:1:5 to prepare a uniform negative electrode slurry.

Carbon black as a conductive agent, carboxymethyl cellulose and styrene butadiene rubber (SBR) as binders were added to distilled water at a weight ratio of 95.3:1.0:1.2:2.5 and mixed to prepare a negative electrode slurry having a solid content of 45 wt %. The negative electrode slurry was applied on a copper current collector having a thickness of 20 μm at a loading amount of 380 mg/25 cm2 and then dried to prepare a preliminary electrode. At this time, the temperature of circulated air was 70° C. Thereafter, the preliminary electrode was roll pressed, dried in a vacuum oven at 130° C. for 12 hours, and then punched to a coin cell size of 1.4875 cm2 to prepare a negative electrode.

<Manufacturing of Lithium Secondary Battery>

A Li metal was used as a counter electrode, and after a polyolefin separator was interposed between the negative electrode and the Li metal, an electrolyte in which 1 M of $LiPF_6$ was dissolved was injected into a solvent in which ethylene carbonate (EC), propylene carbonate (PC), and ethyl methyl carbonate (EMC) were mixed at a volume ratio of 20:10:70.

Example 2

A negative electrode and a lithium secondary battery were manufactured in the same manner as in Example 1 except that artificial graphite having a specific surface area of 1.0 m$^2$/g, a tap density of 0.8 g/cc, a c-axis direction crystal size of 70 nm, and an average particle diameter ($D_{50}$) of 17 μm was used as the artificial graphite.

Example 3

70.8 parts by weight of Si particles having an average particle diameter ($D_{50}$) of 300 nm, 16.7 parts by weight of $Mg(OH)_2$, and 12.5 parts by weight of LiOH were mixed, and then fired in a high-temperature firing furnace, the temperature of which may be controlled, at a temperature of 800° C. for 12 hours to prepare Si particles doped with Mg and Li in an amount of 10 wt % and 5 wt %, respectively.

A negative electrode and a lithium secondary battery were manufactured in the same manner as in Example 1 except that Si particles doped with Mg and Li in an amount of 10 wt % and 5 wt %, respectively, were used Example 4

90 parts by weight of Si particles having an average particle diameter ($D_{50}$) of 300 nm and 10 parts by weight of $Mg(OH)_2$ were mixed, and then fired in a high-temperature firing furnace, the temperature of which may be controlled, at a temperature of 800° C. for 12 hours to prepare Si particles doped with Mg in an amount of 6 wt %.

A negative electrode and a lithium secondary battery were manufactured in the same manner as in Example 1 except that Si particles doped with Mg in an amount of 6 wt % were used.

Example 5

90 parts by weight of Si particles having an average particle diameter ($D_{50}$) of 300 nm and 10 parts by weight of LiOH were mixed, and then fired in a high-temperature firing furnace, the temperature of which may be controlled, at a temperature of 800° C. for 12 hours to prepare Si particles doped with Li in an amount of 4 wt %.

A negative electrode and a lithium secondary battery were manufactured in the same manner as in Example 1 except that Si particles doped with Li in an amount of 4 wt % were used.

Comparative Example 1

The artificial graphite used in Example 1 and having a specific surface area of 0.9 m$^2$/g, a tap density of 1.0 g/cc, a c-axis direction crystal size of 85 nm, and an average particle diameter ($D_{50}$) of 23 μm was used as a negative electrode active material, and a process of attaching the Si particles on the surfaces of the artificial graphite secondary particles was not performed.

A negative electrode and a lithium secondary battery were manufactured in the same manner as in Example 1 except that the artificial graphite was used as a negative electrode active material.

Comparative Example 2

98 parts by weight of artificial graphite having a specific surface area of 3.5 m²/g, a tap density of 0.8 g/cc, a c-axis direction crystal size of 150 nm, an average particle diameter ($D_{50}$) of 20 μm and 2 parts by weight of Si particles having an average particle diameter ($D_{50}$) of 200 nm were subjected to mechanical milling to prepare a negative electrode active material having the Si particles attached to the surfaces of the artificial graphite secondary particles.

A negative electrode and a lithium secondary battery were manufactured in the same manner as in Example 1 except that the negative electrode active material was used.

Comparative Example 3

A negative electrode and a lithium secondary battery were manufactured in the same manner as in Example 1 except that artificial graphite having a specific surface area of 3.5 m²/g, a tap density of 0.8 g/cc, a c-axis direction crystal size of 150 nm, and an average particle diameter ($D_{50}$) of 20 μm was used instead of the artificial graphite;

Experimental Example 1 Evaluation of Initial Efficiency and Cycle Properties

The batteries respectively manufactured in Examples 1 to 5 and Comparative Examples 1 to 3 were charged at 25° C. with a constant current (CC) of 0.8 C until 4.25 V was reached. Thereafter, the batteries were charged for the first time with a constant voltage (CV) until charge current reached 0.005 C (cut-off current). Thereafter, after being left for 20 minutes, the batteries were discharged with a constant current (CC) of 0.8 C until 2.5 V was reached. This was repeated in 1 to 300 cycles. The results are shown in Table 1 below.

Experimental Example 2: Evaluation of Swelling Performance

The charge and discharge were repeated as described in Experimental Example 1, and after the 50th charge, the cell was dissembled and washed in DMC to measure the thickness of the electrode. The thickness of the negative electrode respectively manufactured in Examples 1 to 5 and Comparative Examples 1 to 3 was compared with the thickness of the negative electrode at the time of the 50th charge, and the thickness change rate was shown in Table 1.

TABLE 1

|  | Initial efficiency | Capacity retention rate (@300 cycle) | Swelling (Based on 50 cycles, %) |
| --- | --- | --- | --- |
| Example 1 | 91 | 82 | 56 |
| Example 2 | 91 | 81 | 56 |
| Example 3 | 92 | 80 | 56 |
| Example 4 | 89 | 81 | 56 |
| Example 5 | 90 | 80 | 56 |
| Comparative Example 1 | 93 | 48 | 43 |
| Comparative Example 2 | 85 | 70 | 71 |
| Comparative Example 3 | 89 | 72 | 67 |

Referring to Table 1, it can be confirmed that the initial efficiency, retention rate after the 300th cycle, and swelling properties of the secondary battery comprising the silicon-carbon complex of Examples 1 to 5 are all excellent.

On the other hand, the secondary battery of Comparative Example 1 comprising the artificial graphite negative electrode active material with no Si attached to the surface of the artificial graphite particles had excellent initial efficiency and swelling properties, but poor retention rate after the 300th cycle. Accordingly, it can be confirmed that the artificial graphite negative electrode active material with no Si attached thereto has a problem regarding lifespan properties due to low adhesion force.

Meanwhile, the secondary battery of Comparative Example 2 comprising the negative electrode active material with Si particles attached to the surfaces of the artificial graphite particles having a specific surface area of 3.5 m²/g had poor initial efficiency, retention rate after the 300th cycle, and swelling properties when compared with the secondary battery of Examples 1 to 5. The secondary battery of Comparative Example 2 had better results regarding lifespan properties compared with the secondary battery of Comparative Example 1, but had poor initial efficiency and swelling properties due to a reaction with an electrolyte caused by the specific surface of the carbon-based particles.

Also, the secondary battery of Comparative Example 3 comprising the negative electrode active material with Si which has been doped with Mg and Li in an amount of 6 wt % and 4 wt % respectively attached to the surfaces of the artificial graphite particles having a specific surface area of 3.5 m²/g had improved initial efficiency, retention rate after the 300th cycle, and swelling properties due to the effect of Mg and Li doped with the silicon-based particles when compared with the secondary battery of Comparative Example 2 with no Mg and Li doped therewith. However, the secondary battery of Comparative Example 3 comprises the artificial graphite particles having a specific surface area of 3.5 m²/g as in the case of Comparative Example 2, and thus had poor initial efficiency, retention rate after the 300th cycle, and swelling properties due to a reaction with an electrolyte caused by the specific surface areas of the carbon-based particles when compared with the secondary battery of Examples 1 to 5.

The invention claimed is:
1. A silicon-carbon complex, comprising:
carbon-based particles; and
silicon-based particles,
wherein the silicon-based particles are dispersed and positioned on surfaces of the carbon-based particles,
the carbon-based particles have a specific surface area of 0.4 m²/g to 1.5 m²/g and a tap density of 0.7 g/cc to 1.0 g/cc, and
the silicon-based particles are doped with one or more elements selected from the group consisting of Mg, Li, Ca, and Al, wherein the carbon-based particles are spherical artificial graphite secondary particles assembled of carbon-based primary particles, or the carbon-based particles are flake-type artificial graphite particles assembled of plate-type carbon-based primary particles, wherein the silicon-based particles doped with one or more elements comprise the one or more elements in an amount of 0.5 wt % to 30 wt % based upon a total weight of the silicon-based particles.

2. The silicon-carbon complex of claim 1, wherein the carbon-based particles have a c-axis direction crystal size Lc(002) of 60 nm to 90 nm when measured by x-ray powder diffraction (XRD).

3. The silicon-carbon complex of claim 1, wherein the carbon-based primary particles have an average particle diameter ($D_{50}$) of 1 μm to 10 μm and the spherical artificial graphite secondary particles have an average particle diameter ($D_{50}$) of 10 μm to 30 μm.

4. The silicon-carbon complex of claim 1, wherein the plate-type carbon-based primary particles have an average long axis length ($D_{50}$) of 1 μm to 20 μm, and an aspect ratio of 0.01 to 0.5.

5. The silicon-carbon complex of claim 1, wherein the flake-type artificial graphite particles have an average long axis length ($D_{50}$) of 10 μm to 30 μm, and an aspect ratio of 0.4 to 0.8.

6. The silicon-carbon complex of claim 1, wherein the silicon-based particles have an average particle diameter ($D_{50}$) of 10 nm to 3,000 nm.

7. The silicon-carbon complex of claim 1, wherein the silicon-based particles are Si particles, silicon oxide particles comprising $SiO_x$, wherein $0<x<2$, or a mixture thereof.

8. The silicon-carbon complex of claim 1, wherein the silicon-based particles are doped with Mg and Li.

9. The silicon-carbon complex of claim 8, wherein the silicon-based particles comprise the Mg in an amount of 0.5 wt % to 20 wt % and comprise the Li in an amount of 0.1 wt % to 10 wt % based upon a total weight of the silicon-based particles.

10. The silicon-carbon complex of claim 1, wherein the silicon-based particles are present in an amount of 1 wt % to 5 wt % based upon a total weight of the silicon-carbon complex.

11. A negative electrode slurry composition for a lithium secondary battery comprising the silicon-carbon complex according to claim 1.

12. A lithium secondary battery comprising the silicon-carbon complex according to claim 1.

* * * * *